United States Patent [19]

Holeschovsky et al.

[11] Patent Number: 6,013,731
[45] Date of Patent: Jan. 11, 2000

[54] STABILIZER BASED ON HIGH MOLECULAR WEIGHT POLYOLS HAVING LOW MONOL CONTENT FOR POLYMER POLYOL PRODUCTION

[75] Inventors: Ulrich B. Holeschovsky, Chester Springs, Pa.; Donald W. Simroth, Charleston, W. Va.

[73] Assignee: ARCO Chemical Technology L.P., Greenville, Del.

[21] Appl. No.: 08/991,561

[22] Filed: Dec. 16, 1997

[51] Int. Cl.$^7$ ............... C08L 75/08; C08F 8/30; C08K 5/06; C07C 43/14
[52] U.S. Cl. ............ 525/123; 521/137; 524/728; 524/762; 525/66; 560/24; 560/26; 560/115; 560/146; 560/157; 560/158; 560/198; 568/673; 568/675; 568/679; 568/680
[58] Field of Search ............ 521/137; 525/66, 525/123; 524/728, 762; 560/24, 26, 115, 146, 157, 158, 198; 568/673, 675, 679, 680

[56] References Cited

U.S. PATENT DOCUMENTS

| | | | |
|---|---|---|---|
| Re. 33,291 | 8/1990 | Ramlow et al. | 521/137 |
| 4,390,645 | 6/1983 | Hoffman et al. | 521/137 |
| 4,954,560 | 9/1990 | Gerkin et al. | 524/714 |
| 4,954,561 | 9/1990 | Gerkin et al. | 524/728 |
| 4,997,857 | 3/1991 | Timberlake et al. | 521/116 |
| 5,093,412 | 3/1992 | Mente et al. | 524/762 |
| 5,196,476 | 3/1993 | Simroth | 524/769 |
| 5,494,957 | 2/1996 | Moore et al. | 524/504 |

FOREIGN PATENT DOCUMENTS

| | | |
|---|---|---|
| 95 113 097 | 3/1996 | European Pat. Off. . |
| WO 87/03886 | 7/1987 | WIPO . |

OTHER PUBLICATIONS

Robin W. Dexter, Robert Saxon, and Denise E. Fiori; "m–TMI, A Novel Unsaturated Aliphatic Isocyanate"; A Journal of Coatings Technology Reprint; *Journal of Coatings Technology*, vol. 58, No. 707, pp. 43–47; ©1986 by the Federation of Societies for Coatings Technology, Philadelphia, Pennsylvania U.S.A.

*Primary Examiner*—Rabon Sergent
*Attorney, Agent, or Firm*—Brooks & Kushman P.C.

[57] ABSTRACT

Stabilizer precursors and preformed stabilizers having induced unsaturation, and prepared from low intrinsic unsaturation-containing polyoxyalkylene polyether polyols may be used to form polymer polyols of higher solids content, lower viscosity, and superior filterability and particle size than polymer polyols prepared from stabilizers derived from polyols having higher intrinsic unsaturation, even when the latter are coupled to form high molecular weight stabilizers.

23 Claims, No Drawings

STABILIZER BASED ON HIGH MOLECULAR WEIGHT POLYOLS HAVING LOW MONOL CONTENT FOR POLYMER POLYOL PRODUCTION

TECHNOLOGICAL FIELD

The present invention pertains to polymer polyols. More particularly, the present invention pertains to improved stabilizers for use in the production of polymer polyols by the in situ polymerization of one or more vinyl monomers in a polyoxyalkylene polyether polyol.

BACKGROUND OF THE INVENTION

Polymer polyols are high volume commercial products whose main use is in the production of polyurethane slab stock, high resilience, and molded foams. Polymer polyols consist of a dispersion of vinyl polymers in a continuous phase which generally comprises a polyoxyalkylene polyol. Polymer polyols have been produced by numerous methods in the past. For example, vinyl polymers have been separately synthesized and subjected to in situ particle size reduction in a polyol. So-called "redispersable graft polyols" have been prepared by first preparing vinyl polymers in small particulate form, followed by dispersing these particles in a polymer polyol. However, the most common method of producing polymer polyols has been, and remains today, the in situ polymerization of one or more vinyl monomers in a continuous polyol phase. In the present application, the term "polymer polyol" refers to polymer polyols produced by such in situ vinyl monomer polymerization.

Numerous problems have been associated with the production and use of polymer polyols. Commercially acceptable polymer polyols must have a reasonably low viscosity, i.e., below 10,000 mPa•s and preferably about 5,000 mPa•s or lower; should be stable dispersions which do not tend to settle out over time; should have a relatively narrow particle size range without the presence of large particulates; and should be white in color in order that light colored polyurethane foams may be produced. Early polymer polyols had relatively low solids content. While low solids content is not necessarily an impediment to producing a suitable polyurethane foam product, the production of polymer polyols at low solids is uneconomical. Higher solids polymer polyols may be diluted with conventional polyols for actual use.

Early on in the preparation of polymer polyols, it was believed that a "grafting" reaction took place between a portion of the vinyl monomers and the polyether polyol chain. While a grafting reaction could hypothetically take place at the allylic unsaturation sites which are present in base-catalyzed polyoxypropylene polyols, the allyl group is particularly unreactive relative to other types of ethylenic unsaturation. Thus, many researchers believed that grafting reactions, if they did in fact take place, occurred through abstraction of hydrogen atoms from the alkylene groups of the polyether chain rather than by reaction of the unsaturated allyl group. Regardless of the mechanism by which the polymerization takes place, and regardless of whether grafting in fact occurs, early polymer polyols suffered from relatively low solids content, and were often highly colored as well, ranging from tan to brown to reddish-orange in color. Furthermore, attempts to increase the solids content often led to "seedy" polyols having numerous particles of large particle size which could not be readily filtered; produced very viscous products; or resulted in gelling of the reactor with rather disastrous consequences, necessitating expensive and time consuming reactor clean-up.

It was subsequently discovered that through the purposeful addition of more reactive unsaturation sites into the polyether molecule, polymer polyols of higher solids content and greatly reduced color and viscosity could be obtained. Moreover, it was also discovered that only a relatively small fraction of the total number of polyol molecules need contain unsaturated sites. Apparently, the reaction of the vinyl monomers with the more reactive sites resulted in the production of molecules which acted as stabilizers for the dispersion, preventing the agglomerization of small vinyl polymer particles into large particles, and also preventing coagulation and gelling of the reactor. The stabilizers produced by these reactions are termed "steric stabilizers", as they are believed to function by sterically hindering the agglomeration and/or coagulation of vinyl polymer particles into larger particles.

Steric stabilization may be entropic and/or enthalpic. One can envision an associating population of vinyl polymer particles having relatively long polyether polyol chains extending into space around the particles. The enthalpic changes which occur during particle association are mainly the result of electronic interactions which the various portions of the particles have with the continuous polyol phase and with other polymer particles. The entropic changes are reflective of the decreased degrees of freedom which the extending polyol chains have as the particles agglomerate. The anti-agglomerative effect achieved by entropic stabilization is derived from the decrease in entropy of the polyol portion of the stabilizer molecule which occurs as particles agglomerate. In other words, the number of degrees of freedom that the polyol portion of the stabilizer can assume in space is decreased as two particles approach. Accordingly, the entropy of the suspension is maximized in the non-agglomerated state.

Several different types of polymer polyol stabilizers have evolved. The earliest stabilizers, sometimes termed "macromonomers" or "macromers", were prepared by the reaction of a polyoxyalkylene polyol with maleic acid followed by isomerization of the maleate cis-double bond to the more reactive fumarate trans-double bond. The products of this reaction were polyetheresters containing a fumarate half-ester moiety. The polyoxyalkylene polyol half-ester could be used as such for a stabilizer precursor, or could be further reacted with alkylene oxide, or esterified with a glycol, to remove the remaining carboxylic acid functionality and replace it with primary or secondary hydroxyl functionality. These "macromonomers" are not stabilizers per se, but form stabilizers during vinyl polymerization. Thus, they may appropriately be called "stabilizer precursors." Such stabilizer precursors have been widely used, and continue to be used to the present day. However, such stabilizers are relatively expensive to prepare due to the relatively long process time which often requires approximately eight hours or more.

Rather than employ maleic anhydride to induce fumarate unsaturation into a stabilizer precursor, molecules containing a hydroxyl-reactive isocyanate group together with a site of reactive ethylenic unsaturation may be used to prepare stabilizer precursors. An example is the use of isocyanatoethylmethacrylate and similar compounds which may be prepared by reacting a hydroxyl functional acrylate such as 2-hydroxyethylacrylate with an excess of diisocyanate. Stabilizer precursors such as these, having very reactive acrylic unsaturation, have been also widely used for polymer polyol production. Unfortunately, compounds such as isocyanatoethylmethacrylate often exhibit storage stability problems, and often must be prepared just prior to use, thus reducing the flexibility of such processes on an industrial scale. A further, more recent example of a functionalizing reactant which may be used to induce unsaturation is "TMI", 1-(t-butyl-isocyanato)-3-isopropenylbenzene.

An alternative approach to the use of "stabilizer precursors" or "macromers" is the use of so-called "preformed stabilizers". As with stabilizer precursors, the manufacture of preformed stabilizers begins by adding induced reactive unsaturation onto a polyoxyalkylene polyol molecule. However, rather than utilize this stabilizer precursor directly in the preparation of polymer polyols by in situ polymerization of vinyl monomers, a limited polymerization of vinyl monomers is first conducted in the presence of the stabilizer precursor. In one approach using preformed stabilizers, very limited vinyl polymerization in the presence of the stabilizer precursor results in a low molecular weight polyoxyalkylene/polyvinyl polymer which remains soluble in the polyol. This process is illustrated by Published International Application WO 87/03886, but is not known to have led to commercial products. It is believed that the vinyl polymer polyol viscosities produced using soluble preformed stabilizers are too high for commercial acceptance.

In a second preformed stabilizer process, the initial vinyl polymerization is continued until a vinyl polymer particle dispersion having a relatively low solids content, i.e., from 3–15 weight percent, is obtained. This vinyl polymerization may be conducted with a relatively high amount of free radical polymerization initiator and chain transfer agent, which encourage the formation of large numbers of relatively small vinyl particulates. The mean particle size may often be one micrometer or less, for example. These preformed stabilizers are translucent or opaque, indicating that a dispersion rather than a solution of preformed stabilizer has been obtained. These preformed stabilizers may also contain some portion of soluble species.

By whichever method the preformed stabilizer is produced, polymer polyols are prepared by further polymerization with vinyl monomers which may be the same as or different than those initially used, generally in the presence of a "carrier polyol" or "base polyol". The carrier polyol generally does not contain any induced unsaturation, and comprises the continuous phase. As with the stabilizer precursor process, the initial, induced unsaturation-containing molecule may be prepared with fumarate-type unsaturation, or through reaction with isocyanate group-containing unsaturated compounds such as isocyanatoethylmethacrylate. Other reactive unsaturated compounds such as TMI may be used as well. The preformed stabilizer process has certain advantages over the stabilizer precursor process, however, in that once prepared, the preformed stabilizer is s table and can be stored for extended periods of time prior to use in preparing the final polymer polyol. By whichever method polymer polyols are produced, these polymer polyols may obtain solids contents as high as 60% or more while achieving relatively low viscosity and being either white or slightly off-white in color. The products achieve acceptable filterability as well, indicating a lack of large size particles.

Stabilizer precursors and preformed stabilizers are both relatively expensive polymer polyol starting materials. When maleic anhydride is used to prepare a stabilizer precursor or a preformed stabilizer, a large part of the expense of the stabilizer is connected with extended processing time. In the case of induced unsaturation derived from isocyanatoethylmethyacrylate, the expense is due more to the expensive nature of the isocyanatoethylmethyacrylate monomer rather than the processing time. In either case, however, it is clear that minimizing the amount of steric stabilizer necessary to prepare the final polymer polyol is highly desirable.

It has been discovered, as illustrated by U.S. Pat. Nos. 4,954,561 and 5,494,957, that the degree of steric stabilization can be markedly increased if the polyether polyol portion of the stabilizer molecule is increased in size through coupling of relatively high molecular weight polyols into yet higher molecular weight coupled products. Coupling is achieved in U.S. Pat. No. 4,954,561 by coupling polyols through use of oxalic acid, forming an oxalate diester, while in U.S. Pat. No. 5,494,957, coupling of stabilizer precursors is obtained through reaction with a diisocyanate. Through such coupling, stabilizer efficiency is improved, allowing for use of smaller portions of stabilizer. However, this increase in efficiency is offset, at least in part, by an increase in raw material cost and processing time due to the separate coupling reaction.

It would be desirable to provide stabilizer precursors and preformed stabilizers which can be used in lower proportions in the production of polymer polyols, and/or which allow the production of polymer polyols having improved properties such as filterability, particle size, lower viscosity, and the like. Such stabilizers should be capable of economic preparation without extended processing time, and in particular, should provide efficient stabilization without the need for coupling.

SUMMARY OF THE INVENTION

It has now been surprisingly discovered that highly efficient and economical polymer polyol stabilizers may be prepared through use of polyoxyalkylene polyols modified to contain induced ethylenic unsaturation, the polyoxyalkylene polyols prior to such modification having levels of intrinsic unsaturation of less than about 0.02 meq/g, a molecular weight, $M_n$ such that $M_n > 3000\ Da \times F^{0.39}$, preferably $>3500\ Da \times F^{0.39}$, and a nominal functionality of 1 or more. Both stabilizer precursors and preformed stabilizers prepared from these low intrinsic unsaturation polyoxyalkylene polyols display efficiencies higher than otherwise similar products prepared from polyols having conventional levels of unsaturation, and have been found to be superior to stabilizers prepared from coupled polyols of much higher molecular weight.

DESCRIPTION OF THE PREFERRED EMBODIMENTS

The stabilizers of the present invention are obtained by adding induced unsaturation to a high equivalent weight, preferably multi-functional polyoxyalkylene polyether polyol having very low intrinsic unsaturation. The resulting stabilizer precursor may be used as such, e.g., as a "macromer" or "macromonomer" stabilizer precursor, or may be used in the further preparation of preformed stabilizers.

By the term "low intrinsic unsaturation" is meant the saturation which unavoidably occurs during polyoxyalkylene polyol synthesis in polyols containing significant propylene oxide-derived moieties or other alkylene oxide-derived moieties which can produce unsaturated alkenol or polyol species through rearrangement. For example, during the conventional base-catalyzed oxypropylation of active hydrogen-containing species such as propylene glycol, significant rearrangement of propylene oxide to allyl alcohol occurs. The allyl alcohol species is oxyalkylated along with the desired propylene glycol "initiator" or "starter." Because allyl alcohol continues to be generated during the entire course of the reaction, a broad molecular weight range of oxyalkylated, allyllic unsaturation-containing monols will be present in the product along with the desired polyoxypropylene glycol. In a 2000 Da equivalent weight diol product, the amount of monol may reach 40 mol percent of the product. The overall functionality is lowered, as a result, from the "nominal" or "theoretical" functionality of 2.0 to the range of 1.6 to 1.7. A molecular weight (as determined from hydroxyl number) of c.a. 4400 Da (2200 Da equivalent weight) is thus the maximum that can be practically obtained for polyoxypropylene diols. The unsaturation of the polyether polyol may be measured by titration in accordance with ASTM D 2849-69, "TESTING URETHANE FOAM RAW MATERIALS", and is expressed as milliequivalents of unsaturation per gram of polyol, or "meq/g".

Catalyst systems have been developed which result in lower levels of unsaturation than that obtainable in base-catalyzed oxypropylation. For example, U.S. Pat. No. 4,687,851 discloses use of calcium naphthenate and alkyl amines as co-catalysts capable of producing 2000 Da equivalent weight polyols with levels of unsaturation of c.a. 0.020 meq/g, as compared to "conventional" levels of 0.05 to 0.11 meq/g for base-catalyzed polyols. Double metal cyanide complex catalysts such as those disclosed in U.S. Pat. No. 5,158,922 have lowered the unsaturation to the range of 0.015–0.018 meq/g. More recently, researchers at the ARCO Chemical Company have devised improved double metal cyanide complex catalysts ("DMC catalysts") which are capable of producing polyols with ultra-low unsaturation, i.e., levels of unsaturation less than 0.010 meq/g, and typically in the range of 0.002 to 0.007 meq/g. Examples of such catalysts and processes for preparing polyoxyalkylene polyols therefrom are disclosed in U.S. Pat. Nos. 5,470,813 and 5,482,908, and commercial products are available from the ARCO Chemical Company under the trade name ACCLAIM™ polyols.

It is the unsaturation which is unavoidably obtained during polyoxypropylation by rearrangement of reactant or product molecules to contain unsaturated sites which is termed "intrinsic" unsaturation as that term is used herein. In the present invention, the intrinsic unsaturation of the polyoxyalkylene polyether used to prepare the stabilizer precursors must be lower than about 0.020 meq/g, preferably about 0.015 meq/g or less, and in particular less than 0.010 meq/g. Such polyols are "low intrinsic unsaturation" polyols as that term is used herein.

In contrast to intrinsic unsaturation, "induced" unsaturation is unsaturation purposefully introduced into the polyoxyalkylene polyether which is to be used as the stabilizer precursor. This unsaturation may be introduced in numerous ways. However, preferred methods include esterification with an unsaturated carboxylic acid or derivative thereof or reaction with another unsaturated, polyol-reactive species. The unsaturation added or "induced" by this process is preferably other than allylic unsaturation, and is preferably reactive unsaturation characteristic of maleate, fumarate, propenyl, isopropenyl, vinyl ether, or acrylic unsaturation.

The polyoxyalkylene polyol having low intrinsic unsaturation will, in general, have a nominal functionality of 1 or more, preferably 2 to 8, and more preferably 2 to 6. Thus, polyoxyalkylene monols are contemplated by the term "polyol" as used herein with respect to stabilizer precursors and preformed stabilizers. Such polyols are prepared by the polyoxyalkylation of initiator molecules having the same functionality. Common initiators include, for example, monofunctional initiators such as n-butanol, n-octanol, and ethylene glycol monoalkyl ethers; difunctional initiators such as ethylene glycol, diethylene glycol, triethylene glycol, propylene glycol and dipropylene glycol; trihydric initiators such as glycerine and trimethylolpropane; tetrafunctional initiators such as pentaerythritol; hexafunctional initiators such as sorbitol; and octafunctional initiators such as sucrose. Those skilled in the art are aware of other suitable initiators as well. The terms "nominal" or "theoretical" functionality in this respect is the functionality which the polyoxyalkylene polyether polyol product should have in the absence of monol generation, i.e. the same functionality as the initiator or mixture of initiators.

The low intrinsic unsaturation polyols generally have hydroxyl and/or amine functionality. Hydroxyl functionality is preferred. Amine functionality may be introduced through amination as disclosed in U.S. Pat. No. 4,954,561, herein incorporated by reference. The low intrinsic unsaturation polyols have molecular weights of about 3000 Da or higher, preferably 4000 Da or higher. However, as will be later discussed, the equivalent weight varies inversely with the functionality of the polyol. Equivalent weights and molecular weights herein are number average equivalent weights and molecular weights expressed in Daltons (Da) unless indicated otherwise. The term "polyol" as used herein includes hydroxyl-functional and amine-functional polyethers as well as polyethers containing both hydroxyl and amine functionalities.

The induced unsaturation may be introduced through esterification (or amidation or imidation, in the case of amino-functional polyols) with an unsaturated carboxylic acid or derivative thereof. Unsaturated carboxylic acid derivatives include those reactive with the polyol reactive functionality, particularly anhydrides and acid chlorides. Suitable carboxylic acid derivatives include such compounds as maleic anhydride, fumaryl chloride, ethylfumaryl chloride, acryloyl chloride, methacryloyl chloride, and the like. Maleic anhydride is preferred. When a dicarboxylic anhydride such as maleic anhydride is used, the remaining acid functionality of the half ester initially produced may be converted to hydroxyl functionality by further reaction with an alkylene glycol, or preferably by oxyalkylation with one or more alkylene oxides. Suitable reaction conditions are well known to the skilled artisan, as indicated by the disclosures of U.S. Pat. No. 4,954,561, Reissue patent 33,291, and U.S. Pat. No. 5,196,476, which are herein incorporated by reference.

The induced unsaturation may also be added through reaction of the low intrinsic unsaturation polyol with a molecule containing both isocyanate functionality and a reactive unsaturated group. Non-limiting examples of the latter compounds include isocyanatoethylmethacrylate as disclosed in U.S. Pat. No. 4,390,645, and TMI, as disclosed in U.S. Pat. Nos. 5,494,957, 4,954,561, 4,954,560, and 5,093,412, these five patents herein incorporated by reference. Induced unsaturation may also be added by forming an adduct of an isocyanate-reactive unsaturated compound such as 2-hydroxyethylacrylate with a di- or polyisocyanate and reacting the adduct with the low intrinsic unsaturation polyol. In the latter case, an excess of diisocyanate may result in some coupled stabilizer precursor molecules. Coupled stabilizers prepared from low intrinsic unsaturation polyols are within the scope of the invention. However, it is preferred that the polyols not be coupled or that coupling is minor.

Preferably, maleic anhydride or TMI is used to impart induced unsaturation. Most preferably, TMI is used. Other reactive molecules containing unsaturation which are reactive with hydroxyl groups or amino groups, as the case may be, may also be used. The stabilizer precursor may be prepared ex situ, or, in the case of amine-terminated low intrinsic unsaturation polyols, may be prepared in situ, for example in a carrier polyol or diluent. The stabilizer precursor may contain, on the average, from 0.01 to about 2 mol of induced unsaturation per mol of stabilizer precursor, preferably 0.05 mol to 1.2 mol, and most preferably about 0.2 mol to 1 mol.

The stabilizer precursors thus obtained may be used directly in the production of polymer polyols, either as prepared, or following dilution with additional polyol. In the latter case, the polyol diluent need not be of the low unsaturation type. Conventional base-catalyzed polyols may be used for this purpose, for example. Methods of preparing polymer polyols from stabilizer precursors may be found in U.S. Pat. Nos. 5,093,412; 5,494,597; 4,390,645; and Re 33,291, which have been previously discussed.

Preferably, however, the stabilizer precursors are employed to produce preformed stabilizers. In the preparation of preformed stabilizers, vinyl monomers are polymerized in situ in the stabilizer precursor, optionally in the presence of additional polyol and/or a low molecular weight diluent such as isopropanol to form a fine dispersion of vinyl polymer particles at relatively low solids content. The solids content may range from about 3 weight percent or lower to about 20 weight percent or higher. Solids content in the range of about 3 weight percent to 10 weight percent is preferred. Soluble preformed stabilizers such as those disclosed in WO/87/03886 may also be prepared, but are not preferred. In such cases, the "solids content" referred to previously will be the weight percent of vinyl polymer. Methods of preparation of preformed stabilizers are illustrated by U.S. Pat. Nos. 5,196,476 and 5,494,957.

Due to the different nature of the stabilizer precursors and preformed stabilizers of the present invention as compared to conventional stabilizers prepared from higher intrinsic unsaturation-containing polyols, polymer polyols prepared from the subject invention stabilizers will be different from prior art polyols as well. Moreover, polyurethane products, particularly polyurethane foams and microcellular elastomers will also be different.

Polymer polyols may be prepared from the stabilizers of the subject invention by methods disclosed in the patents previously identified and other methods known to those skilled in the art. In general, vinyl polymerization is conducted in the presence of the stabilizer, generally also in the presence of a carrier polyol which will form the largest part of the liquid phase. Polymerization is generally initiated by means of conventional vinyl polymerization free radical initiators such as the well known azo compounds, peroxides, peroxyesters, peroxyketones, and the like.

Vinyl monomers suitable for use in preparing the polymer polyols and preformed stabilizers of the subject invention include all those generally accepted as suitable for preparing polymer polyols, including without limitation, the various acrylate compounds such as acrylic acid, methacrylic acid, methylacrylate, methylmethacrylate, ethylacrylate, and the like; acrylamides such as acrylamide and methacrylamide; vinyl compounds such as vinyl chloride and vinylidene chloride; acrylonitrile; styrene; brominated styrenes such as dibromostyrene, tribromostyrene, and mixtures of these; α-methylstyrene; p-methylstyrene, and the like. Acrylonitrile and styrene are preferred, optionally with minor amounts of halogenated monomers such as vinylidene chloride or dibromostyrene.

The vinyl polymerization may be conducted in batch, semi-batch, or continuous processes. Monomers may be added in a mixed stream, or dissolved in additional stabilizer and/or carrier polyol. Free radical catalysts may be added as a separate stream or dissolved in additional carrier polyol. Chain transfer agents are preferred to be added along with other reactants. Suitable chain transfer agents are those conventionally used, i.e., isopropanol, benzene, toluene, thiols such as n-dodecane thiol, halogens, and halogenated hydrocarbons, particularly iodinated and brominated hydrocarbons.

In the preparation of polymer polyols, vinyl polymerization proceeds until the desired vinyl solids content is achieved, in general from 30 weight percent to about 60 weight percent or higher, more preferably 40 weight percent to 60 weight percent. The viscosity of the product generally rises with increasing solids content, and is preferably less than 10,000 mpa•s, more preferably less than 5,000 mpa•s. It has been found that use of the stabilizers of the present invention are capable of producing lower viscosity polymer polyols than even coupled stabilizers prepared from conventional polyols of much higher molecular weight.

The stabilizer precursors and preformed stabilizers of the subject invention are surprisingly effective in producing polymer polyols having excellent filterability, low viscosity, and small particle size. The excellent stabilizing effect of the subject invention stabilizer precursors is not due to the high equivalent weights made possible through use of highly efficient, ultra-low unsaturation-producing oxyalkylation catalysts such as double metal cyanide complex catalysts, as stabilizers prepared from low intrinsic unsaturation polyols with equivalent weights in the range of 2000 Da have been found highly efficient, and have produced polymer polyols with excellent physical characteristics. Triols and hexols of 2000 Da equivalent weight or lower but having conventional levels of unsaturation can be prepared using conventional base catalysis. However, stabilizers prepared from these polyols cannot match the performance of the subject invention stabilizers when preparing polymer polyols.

The molecular weight of the stabilizer precursors of the subject invention varies inversely with the functionality of the low intrinsic unsaturation polyol used to prepare the stabilizer precursor. In order to prepare efficient stabilizers, the polyol used in preparing the stabilizer precursor should have a minimum molecular weight. This molecular weight, $M_n$, should preferably be governed by the formula:

$$M_n > 3000 \times F^{0.39},$$

more preferably, $M_n > 3500 \times F^{0.39}$, where F is the average functionality of the low intrinsic unsaturation polyol. Thus, for example, a stabilizer precursor formed from a low intrinsic unsaturation polyoxypropylene monol requires the monol to have a minimum molecular weight of about 3000 Da, while a stabilizer precursor formed from a low intrinsic unsaturation hexol requires a minimum molecular weight of about 6000 Da. If differing methods of determining number average molecular weights result in slightly different values for $M_n$, the method giving the higher value represents the molecular weight for purposes of assessing whether such a polyol meets the minimum low intrinsic unsaturation polyol molecular weight limitation. For example, if the number average molecular weight is determined from the hydroxyl number assuming that the monol or polyol has a functionality equal to the "nominal", or "theoretical" functionality (i.e. the functionality of the starter) of 8040 Da and the number average molecular weight determined by gel permeation chromatography or another analytical technique is 8250 Da, the latter will be considered the $M_n$ for the low intrinsic unsaturation monol or polyol.

When mixtures of two or more low intrinsic unsaturation polyols are used, the functionality F will be the mol average functionality. Thus, if the polyol mixture contains 30 mol percent of low intrinsic unsaturation diol and 70 mol percent of low intrinsic unsaturation triol, the average functionality will be (0.30) (2)+(0.70) (3), or 2.7. The number average molecular weight required to prepare an efficient stabilizer will then be about 4300 Da.

Having generally described this invention, a further understanding can be obtained by reference to certain specific examples which are provided herein for purposes of illustration only and are not intended to be limiting unless otherwise specified.

Stabilizer Precursor General Procedure

Stabilizer precursors are generally prepared neat, without the presence of solvents and/or diluents. Methods of preparing maleate and fumarate induced unsaturation-containing stabilizer precursors from polyols of conventional levels of unsaturation are well known. These methods are also applicable to stabilizer precursor preparation employing low intrinsic unsaturation polyols. When employing isocyanate-functional reactants such as isocyanatoethylmethacrylate or TMI, or the use of a diisocyanate to couple a low intrinsic unsaturation polyol with an unsaturated molecule such as 2-hydroxyethylmethacrylate, the reaction between the isocyanate-functional compound and the low intrinsic unsaturation polyol may be performed by conventional urethane linkage-generating reaction process methods, for example by performing the reaction at modestly elevated temperature, i.e. from 50° C. to 90° C. without limitation, optionally in the presence of a minor amount of a urethane-promoting catalyst. The reaction is advantageously conducted under a nitrogen or other inert gas blanket until the isocyanate has been completely reacted.

Preformed Stabilizer General Procedure

Preformed stabilizers may be conveniently prepared in a two-stage reactor system by copolymerizing unsaturated monomers such as styrene and acrylonitrile in situ in a mixture containing a stabilizer precursor and a diluent. The two-stage reactor consists of a first stage, back-mixed reactor having a volume of 450 mL, agitated with a top mounted impeller. Feed streams are introduced into the bottom of the reactor, with the takeoff at the top. The reactor is normally operated liquid full, and the temperature controlled via heating tapes and forced-air cooling. The outlet from the first stage is fed to an unstirred second stage reactor having a volume of about 480 mL and a height to diameter ratio of about 5. Pressure of the feed to the second stage is regulated by a back pressure regulator, and is maintained at the desired value by a second back pressure regulator in the second stage outlet line. Vinylic monomers, e.g. styrene, acrylonitrile, vinylidene chloride, etc., are fed at the desired ratio from a premixed blend contained in a feed tank. A second feed tank is used to supply stabilizer precursor, any additional polyol, free radical polymerization catalyst, diluent, and chain transfer agent, when used. The two feed streams are combined into a single stream and fed to a first stage inlet through an in-line static mixer.

The first stage reactor is filled with polyol feed mix to a pressure of 45–65 psig. Agitation is begun and heat applied. When the temperature reaches 100° C., polyol flow is begun. When the internal temperature reaches 115° C. and polyol flow has continued for ten minutes, monomer flow is begun, and ramped at intervals of 10–12 minutes until the desired flow rate is achieved. Initial monomer flow rate preferably lies between about 55% to 70% of the final target rate.

The first stage is lined out for about 6 residence times by diverting the outlet stream to waste. The outlet stream is then switched to the empty, cold second stage. When the second stage is 70–80% full and pressure starts to build, heat is applied. Initial product is discarded. The desired product is generally collected for at least about 13 hours. The diluent is generally not stripped from the preformed stabilizer product.

Polymer Polyol General Procedure

The same reactor described as useful for preformed stabilizer preparation may be used for preparation of polymer polyols, each run generally conducted for six residence (non-waste) times, or a minimum of about 2 hours. In polymer polyol production, the amount of stabilizer precursor and/or preformed stabilizer are selected to obtain the desired solids content, polymer polyol viscosity, mean particle size and filterability as in conventional polymer polyol preparation. However, it has been found that in the process of the present invention, the amount of stabilizer used may be less than the amount used in conventional processes, while maintaining or significantly improving polymer polyol viscosity, particle size, and filterability. That such reduced use of stabilizer produces polymer polyols of similar, and in some cases highly improved characteristics, is particularly surprising in view of the fact that the stabilizer precursors may be of much reduced molecular weight.

In polymer polyol production, a considerable amount of carrier polyol is supplied to the reactor along with the stabilizer precursor or preformed stabilizer, and the rate of monomer feed relative to polyol feed is increased over that used to prepare preformed stabilizers. Moreover, the amount of diluent, i.e. isopropanol, is considerably less as well. In general, when preformed stabilizers are employed in the production of polymer polyols, isopropanol or other diluent or chain terminator is supplied from the preformed stabilizer component. The carrier polyol generally constitutes from 80 weight percent to 95 weight percent of the total polyol feed on a non-limiting basis. The vinyl polymerization may be conducted in one or more steps to obtain the desired solids content.

Crude polymer polyol products are vacuum stripped at c.a. 130° C. and 3–5 torr followed by nitrogen sparge to remove unreacted monomers and low boiling components. Other methods may be used for both preformed stabilizer production, and polymer polyol production as well. For example, but not by way of limitation, batch and semi-batch procedures may be used.

Filterability is determined by diluting one part by weight sample (e.g., 200 grams) of polymer/polyol with two parts by weight anhydrous isopropanol (e.g., 400 grams) to remove any viscosity imposed limitations and using a fixed quantity of material in relation to a fixed cross-sectional area of screen (e.g., 1⅛ in. diameter), such that all of the polymer/polyol and isopropanol solution passes by gravity through a 150-mesh or 700-mesh screen. The 150-mesh screen has a square mesh with average mesh opening of 105 microns, and is a "Standard Tyler" 150 square-mesh screen. The 700-mesh screen is made with a Dutch twill weave. The actual screen used had a nominal opening of 30 microns. The amount of sample which passes through the screen is reported in percent, a value of 100 percent indicates that over 99 weight percent passes through the screen.

EXAMPLES 1–5

Stabilizer Precursor Preparation

EXAMPLE 1

A stabilizer precursor is prepared by reacting an 8000 Da polyoxypropylene diol with TMI. The polyoxypropylene diol component consists of about 80 weight percent of a double metal cyanide complex-catalyzed polyoxypropylene diol having a hydroxyl number of 14.28, an intrinsic unsaturation of 0.0049 meq/g, and a viscosity of 3166 cks, and about 20 weight percent of a similar, DMC-catalyzed polyoxypropylene diol having a hydroxyl number of 14.25, an intrinsic unsaturation of 0.0048 meq/g, and a viscosity of 3057 cks. Both diols are believed to have polydispersities of approximately 1.09 (Mw/Mn). To 100 parts of the polyoxypropylene glycol component is added 2.7 parts TMI and 500 ppm of urethane-promoting catalyst, COSCAT 83, and the mixture is heated to 90° C. and stirred at this temperature for about 2 hours, following which 60 ppm t-butylcatechol is added. The viscosity of the stabilizer precursor is c.a. 4120 cks.

EXAMPLE 2

A stabilizer precursor is prepared in accordance with the procedure of Example 1, except that an 11,000 Da number average molecular weight (calculated from hydroxyl number) polyoxypropylene diol having a hydroxyl number of 10.49, an unsaturation of 0.0043 meq/g, and a viscosity of 8543 cps is reacted with TMI at a 1:1 mol ratio. The viscosity of the stabilizer precursor is 10,339 cks.

EXAMPLE 3

The procedure of Example 1 is followed employing a 12,000 Da molecular weight hexol prepared by reacting a sorbitol-initiated polyoxypropylene hexol having a hydroxyl number of 28.3, an intrinsic unsaturation of 0.0046 meq/g, and a viscosity of 1851 cks with 0.457 mol TMI per mol polyol. The resulting stabilizer precursor has a viscosity of 2,211 cks.

EXAMPLE 4

A stabilizer precursor is prepared following the procedure of Example 1. The low intrinsic unsaturation polyol is a glycerine started polyoxypropylene/polyoxyethylene triol containing 20 weight percent randomly distributed oxyethylene moieties, a hydroxyl number of 27.86 ($M_n$, calculated from hydroxyl number, of 6040 Da), and an unsaturation of 0.0091 meq/g. TMI in the amount of 2.33 parts is reacted with 97.16 parts polyol in the presence of 0.51 parts FLEXOL™ epoxidized soybean plasticizer. The reaction is catalyzed with 0.001 parts COSCAT-83 urethane-promoting catalyst. The reaction is begun without catalyst and held at 75° C. for 2 hours, following which the catalyst is added and the reaction mixture held at 75° C. for an additional 2 hours. A stabilizer precursor having a viscosity of 1401 cks is obtained.

EXAMPLE 5

A stabilizer precursor is prepared using the procedure of Example 1, employing as the ultra low intrinsic unsaturation polyol a 12,000 Da glycerine started polyoxypropylene/polyoxyethylene copolymer polyol containing 12 weight percent randomly distributed oxyethylene moieties. The oxyethylene moieties were added toward the end of the oxyalkylation as a 50/50 mixture with propylene oxide. The polyol has a hydroxyl number of 14.17, an unsaturation of 0.0035 meq/g, and a viscosity of 4799 cks. To 100 parts polyol is added 1.8 parts TMI and the reaction continued in the presence of 0.05 parts of COSCAT-83 urethane-promoting catalyst, and stirred for 2 hours at 90° C.

COMPARATIVE EXAMPLE C1

A coupled stabilizer precursor is prepared from a 12,000 Da nominal molecular weight polyoxypropylene sorbitol polyol (2,000 Da equivalent weight) having a hydroxyl number of 28, and having a 10 weight percent ethylene oxide cap. A sorbitol polyol/maleic anhydride half ester is prepared and capped with c.a. 3.0 mol ethylene oxide to eliminate the remaining half-ester carboxylic acid functionality, in accordance with the procedures given in U.S. Pat. No. 4,997,857. The intrinsic unsaturation of the sorbitol polyol is about 0.06 meq/g. The induced unsaturation is found to about 0.094 meq/g. The reaction product is coupled to form a 24,000 Da molecular weight coupled stabilizer precursor by reaction with a liquid preparation of 4,4'-methylenediphenylene diisocyanate available from the Dow Chemical Company as ISONATE 143L. The coupled stabilizer precursor is reacted in situ with acrylonitrile and styrene in accordance with Example 3 of U.S. Pat. No. 5,196,476 to form a preformed stabilizer.

EXAMPLES 6–10

Stabilizer Precursor Preparation

EXAMPLE 6

A preformed stabilizer is prepared from the stabilizer precursor of Example 1. The continuous, two-stage reactor system previously described is employed. The temperature of the first reactor stage is maintained at 120° C. during the run, and the pressure maintained at 65 psig. First stage residence time is approximately 45 minutes.

The polyol feed stream consists of 28.5 parts of the stabilizer precursor of Example 1, 0.07 parts t-butylperoctoate free radical polymerization initiator, and 71.4 parts isopropanol. The monomer feed stream consists of a 50:50 mixture of acrylonitrile and styrene. Polyol feed rate is 506 g/hr, while the monomer feed rate is 95.8 g/hr. The acrylonitrile/styrene ratio calculated to be 38.2/61.8 based on unreacted monomer collected. The total polymer solids in the preformed stabilizer is 5.4 weight percent.

EXAMPLE 7

A preformed stabilizer in accordance with the present invention is prepared in a manner similar to that of Example 6. The polyol feed consists of 28.54 parts of the stabilizer precursor of Example 2, 71.34 parts isopropanol, and 0.12 parts t-butylperoctoate. The vinyl monomer feed stream consists of a 50:50 mixture of acrylonitrile and styrene. Polyol flow rate is set to 383 g/hr, while the monomer feed is set to 72.3 g/hr. Total operation time is 20 hours, and the reactor temperature is maintained in the range of 117–120° C. at a pressure of 60 psig. The acrylonitrile/styrene ratio is approximately 35/65 with a total solids content of 6.66 weight percent. The viscosity of the preformed stabilizer is 116.9 cks, and the mean particle size 0.64 µm.

EXAMPLE 8

The stabilizer precursor of Example 3 is employed to prepare a preformed stabilizer in accordance with the procedure of Example 6. Polyol flow rate is 246 g/hr and monomer flow rate is 208.9 g/hr. The polyol feed stream contains 55.4 parts isopropanol, 0.2 parts t-butylperoctoate, and 44.4 parts of the stabilizer precursor of Example 3. The monomer feed stream contains 17.3 parts acrylonitrile, 17.3 parts styrene, and 65.3 parts isopropanol. The product is not stripped to remove isopropanol. A preformed stabilizer containing 6.88 total solids, a viscosity of 15.8 cks, and particle size of 1.23 µm is obtained.

EXAMPLE 9

A preformed stabilizer is prepared following the procedure of Example 6, employing the stabilizer precursor of Example 4. Reactor temperature is maintained at 120° C. in both reactor stages. Polyol feed rate is 302.1 g/hr and monomer feed rate is 256.4 g/hr. The polyol contains 44.4 parts of the stabilizer precursor of Example 4, 55.5 parts isopropanol, and 0.2 parts t-butylperoctoate. The monomer feed consists of 65.4 parts isopropanol and 34.6 parts of 50/50 acrylonitrile/styrene. Collected is 2.3 Kg of preformed stabilizer having a mean particle size of 0.934 µm and a viscosity of 20.7 cks containing 6.46 weight percent poly (acrylonitrile/styrene) solids.

EXAMPLE 10

A preformed stabilizer is prepared in the same manner as Example 6. The polyol feed stream, consisting of 71.1 parts isopropanol, 28.5 parts of the stabilizer precursor of Example 5, and 0.4 parts t-butylperoctoate, is fed into the reactor at a rate of 505 g/hr. Monomer feed, at 95.4 g/hr is a 50/50 mixture of acrylonitrile/styrene. The unstripped product (3.83 Kg) has a polymer solids content of 5.8 weight percent, an acrylonitrile/styrene ratio of 40/60 based on unreacted monomer, a viscosity of 51.96 cks, and a mean particle size of 0.88 µm.

EXAMPLES 11–16

Polymer Polyol Preparation

EXAMPLE 11

A polymer polyol is prepared in the two-stage continuous reactor previously described, employing the low intrinsic unsaturation preformed stabilizer of Example 6. The reactor temperature is set at 115° C. with a pressure of 45 psig. A 60 minute residence time is employed. The polyol feed consists of 89.93 weight percent of a commercial, base-catalyzed (KOH) carrier (base) polyol having conventional intrinsic unsaturation, available from the ARCO Chemical Company as ARCOL® 16-52 polyether polyol. In addition to the carrier polyol, the polyol feed contains 9.6 weight percent of the low intrinsic unsaturation preformed stabilizer of Example 6, and 0.47 weight percent AIBN (N,N-azobis (isobutronitrile) as free radical polymerization initiator. The polyol feed rate is 256 g/hr. The vinyl monomer blend consists of acrylonitrile/styrene in a weight ratio of 33:67. The monomer feed rate is 195 g/hr. The lineout of time of the reactor is 10 hours at these process parameters.

The crude polymer polyol product is stripped and 5200 ppm of a standard antioxidant stabilizer package added. The product is a white vinyl polymer dispersion in the carrier polyol, having a hydroxyl number of c.a. 28, and 44.9 weight percent of 33:67 acrylonitrile/styrene polymer solids. The polymer polyol viscosity is 4598 cks, and exhibits 100% filterability through 150 and 700 mesh filters at 11.4 and 318 seconds, respectively. The retention at 150 mesh is very low at 2 ppm. Mean particle size is 1.43 µm.

EXAMPLE 12

A polymer polyol is prepared using the preformed stabilizer of Example 7, and the two-stage continuous reactor previously described. The reactor temperature is set at 115° C., and the pressure at 60 psig. The first stage residence time is approximately 60 minutes. The polyol feed consists of 89.82 weight percent of a commercial, base-catalyzed (KOH) carrier (base) polyol of normal intrinsic unsaturation, available from the ARCO Chemical Company as ARCOL 16-52. The polyol feed, in addition to the carrier polyol, contains 9.6 weight percent of the preformed stabilizer of Example 7, and 0.58 weight percent AIBN (N,N-azobis (isobutyronitrile) as free radical polymerization initiator. The vinyl monomer feed consisted of acrylonitrile and styrene in a 33:67 weight ratio. The polyol feed rate is 260 g/hr and the monomer feed rate is 198 g/hr. Lineout time is 10 hours. The polymer polyol crude product is stripped and a standard antioxidant package added in the amount of 5200 ppm. The final product has a hydroxyl number of 28, and contains 45 weight percent of 33/67 acrylonitrile/styrene polymer particles as the dispersed phase. The product passes 150 mesh filtration in 12.6 seconds with a retention of only 1.5 ppm. The 700 mesh filtration time (100%) is 347.7 seconds, and the polyol viscosity is 4661 cks. Mean polymer particle size is 1.40 µm, with 90% below 2.37 µm.

EXAMPLE 13

The preformed stabilizer of Example 8 is employed to prepare a polymer polyol in accordance with the procedure of Example 11. The polyol feed rate is 265.6 g/hr, the polyol feed consisting of 84.7 parts ARCOL® 16-52 polyether polyol, 14.7 parts of the preformed stabilizer of Example 8, and 0.6 parts AIBN. Monomer feed rate is 191.3 g/hr, the monomer feed consisting of acrylonitrile/styrene in a weight ratio of 33/67. Approximately 3.6 Kg of product was collected over an eight hour period. Following stripping, the polymer polyol is found to contain 44.9 weight percent solids, has a low viscosity of only 3216 cks, and a mean particle size of 1.51 as measured with a MICROTRAC™ X100 Particle Analyzer based on volume percent. The polymer polyol displays excellent filterability with a 150 mesh filtration time (100% pass through) of 12 seconds with 2 ppm retention, and a 700 mesh filtration time (100%) of only 225 seconds.

EXAMPLE 14

A polymer polyol is prepared employing the procedure of Example 11, employing the preformed stabilizer of Example 9. The reactor temperature is set to 115° C. and 45 psig. Polyol feed rate is 266.1 g/hr and monomer feed rate is 200.0 g/hr. The polyol feed consists of 88.1 parts of ARCOL® 16-52 polyether polyol, 11.4 parts of the preformed stabilizer of Example 9, and 0.6 parts AIBN. The monomer feed consists of a 33/67 mixture of acrylonitrile/styrene. Following stripping and addition of the standard antioxidant package, the polymer polyol is found to have a polymer solids content of 45 weight percent, a viscosity of only 3450 cks, and a mean particle size of 1.51 µm. The filterability is such that the 150 mesh (100%) filtration time is 14 seconds with a retention of only 1 ppm, while the 700 mesh filtration time is only 210 seconds.

EXAMPLE 15

A polymer polyol is produced in the same manner as Example 11. The polyol feed rate is 255.1 g/hr, the polyol feed consisting of 89.8 parts ARCOL® 16-52 polyether polyol, 9.6 parts of the preformed stabilizer of Example 10, and 0.58 parts AIBN. The monomer stream consists of a 33/67 weight ratio of acrylonitrile/styrene fed at a rate of 194.8 g/hr. Approximately 3.62 Kg of product is collected. Following stripping and addition of antioxidant package, the polymer polyol product is found to contain 44.8 weight percent polymer solids, a mean particle size of 1.47 μm, and has a viscosity of 4166 cks. Filterability is 10.2 seconds (100%) at 150 mesh with a retention of 2.5 ppm, and only 244 seconds at 700 mesh.

EXAMPLE 16

The procedure of Example 15 is followed with a reduced preformed stabilizer level of 7.3 parts of the preformed stabilizer of Example 10, and 0.59 parts AIBN. Polyol feed rate is 252.6 g/hr and monomer feed rate is 197.5 g/hr. The resulting polymer polyol has a polymer solids content of 44.7 weight percent, a viscosity of only 3770 cks, a 150 mesh (100%) filterability of 13 seconds with 8.5 ppm retention, and 700 mesh filterability of 490 seconds. Mean particle size is 1.6 μm.

COMPARATIVE EXAMPLE C2

A polymer polyol is prepared from the preformed stabilizer of Comparative Example C1. The polyol feed rate is about 260 g/hr, the polyol feed consisting of 89.8 parts ARCOL® 16-52 polyether polyol, 9.6 parts of the pre-formed stabilizer of Comparative Example C1, and 0.58 parts N,N-azobis(isobutyronitrile) free radical polymerization catalyst. The monomer feed consists of a 30:70 wt/wt mixture of acrylonitrile/styrene fed into the first reactor stage at a rate of about 200 g/hr. First stage reactor temperature is 116° C. and the pressure 45 psig. The stripped product collected amounts to 4325 g of a 43 weight percent solids polymer polyol. The polymer polyol has a viscosity of 4336 cks and an average particle size of 1.70 μm. The filterability of the polymer polyol is such that 100% passes a 150 mesh filter in 16 seconds with a retention of 8 ppm, and 100% passes a 700 mesh filter in 389 seconds.

The examples indicate that use of low intrinsic unsaturation stabilizer precursors and preformed stabilizers prepared therefrom results in the efficient production of polyols having improved viscosities, improved filterability, and lower particle sizes as compared to similar polymer polyols prepared from coupled stabilizers of much higher molecular weight. The improvement in viscosity is particularly noteworthy as the polymer polyols of the subject invention Examples contain higher weight percent solids than the polymer polyol of Comparative Example C2 and a smaller particle size as well. The increased dispersed phase surface area due to the larger number of smaller particles would be expected to markedly increase the viscosity. However, the viscosities are comparable, and in the case of Example 13, 14, and 16 are considerably reduced. The filtration times are improved markedly as well. It should also be noted that conventional stabilizers prepared from TMI and maleic anhydride reacted with conventional polyols not having low intrinsic unsaturation have been found to behave similarly. Thus, the nature of the unsaturation-inducing moiety (TMI or maleic anhydride) is not believed to be a result-influencing variable. The results are summarized in Table 1.

TABLE 1

POLYMER POLYOL PREPARATION AND PROPERTIES

| EXAMPLE | C2 | 11 | 12 | 13 | 14 | 15 | 16 |
|---|---|---|---|---|---|---|---|
| Stabilizer Precursor of Example | C1 | 1 | 2 | 3 | 4 | 5 | 5 |
| Preformed Stabilizer of Example | C1 | 6 | 7 | 8 | 9 | 10 | 10 |
| Stabilizer Precursor Polyol Functionality | 6[1] | 2 | 2 | 6 | 3 | 3 | 3 |
| Stabilizer Precursor Polyol Intrinsic Unsaturation (meq/g) | 0.06 | 0.005 | 0.005 | 0.0046 | 0.0091 | 0.0035 | 0.0035 |
| Stabilizer Precursor Polyol Mol. Wt. (Da) | 24,000[1] | 8000 | 12,000[2] | 12,000 | 6000[3] | 12,000 | 12,000 |
| Stabilizer Precursor Polyol Type | Conventional Unsaturation, Coupled | Low Intrinsic Unsaturation | Low Intrinsic Unsaturation | Low Intrinsic Unsaturation | Low Intrinsic Unsaturation | Low Intrinsic Unsaturation | Low Intrinsic Unsaturation |
| Polymer Polyol Solids, Wt. % | 43 | 44.9 | 45.0 | 44.9 | 45.0 | 44.8 | 44.7 |
| Polymer Polyol Viscosity (cks) | 4336 | 4598 | 4661 | 3216 | 3450 | 4166 | 3770 |
| Polymer Polyol Mean Particle Size (μm) | 1.70 | 1.43 | 1.40 | 1.51 | 1.51 | 1.47 | 1.60 |
| 150 Mesh Filtration Time, Sec. | 16 | 11.4 | 12.6 | 12.0 | 14.0 | 10.2 | 13 |
| Particles Retained, ppm | 8 | 2 | 1.5 | 2 | 1 | 2.5 | 8.5 |
| 700 Mesh Filtration Time, Sec | 389 | 318 | 348 | 225 | 210 | 244 | 490 |

[1]Coupled hexol, functionality based on hexol.
[2]$M_n$ calculated from hydroxyl number is c.a. 11,000 Da.
[3]$M_n$ calculated from hydroxyl number is 6040.

By the term "derived from" as used herein relative to the composition of a stabilizer precursor derived from a low intrinsic unsaturation polyether polyol is meant that such a polyol is used at some point in the preparation of the stabilizer precursor, and therefore a residue of that polyol will be contained in the stabilizer. Free unreacted polyol may also be contained in the stabilizer. By the term "polyol" as used herein with respect to stabilizer precursor or preformed stabilizer is meant a polyoxyalkylene polyether with one or more reactive functionalities, which are preferably hydroxyl groups. Thus, the term "polyol" in this respect is inclusive of monols and other mono-functional low intrinsic unsaturation polyethers as well.

By the terms "major" and "minor" when used, is meant 50% or more and less than 50%, respectively, in terms of the parameter which these terms modify. The practice of the invention disclosed and claimed herein can be made to the exclusion of any ingredient not indicated as a necessary ingredient. A low intrinsic unsaturation polyether polyol is a necessary ingredient in the preparation of the stabilizer precursors of the present invention; a stabilizer precursor derived from a low intrinsic unsaturation polyether polyol is a necessary ingredient in the preparation of the preformed stabilizers of the present invention; and the stabilizer precursor(s) and/or preformed stabilizer(s) just described are a necessary ingredient in the preparation of the polymer polyols of the present invention. Minor quantities of conventional polyether polyols, particularly those with intrinsic unsaturation in the range of 0.02–0.04 meq/g and preformed stabilizers prepared therefrom may be used in conjunction with stabilizer precursors and preformed stabilizers derived from low intrinsic unsaturation polyether polyols so long as the substantial benefits of the present invention are retained. In particular, where a process, reactant, ingredient, or reaction product thereof is described by the terms preferred, more preferred, most preferred, particularly preferred, or like terms indicative of preference, these preferred processes, reactants, ingredients, or reaction products thereof or thereby may be claimed to the exclusion of other ingredients not indicated as "necessary". By the term "a" is meant "one or more" unless indicated to the contrary.

Having now fully described the invention, it will be apparent to one of ordinary skill in the art that many changes and modifications can be made thereto without departing from the spirit or scope of the invention as set forth herein.

What is claimed is:

1. A stabilizer suitable for the preparation of polymer polyols by the in situ polymerization of one or more vinyl monomers in a polyol containing said stabilizer, said stabilizer comprising a stabilizer precursor derived from a low intrinsic unsaturation-containing polyoxyalkylene polyether polyol having an intrinsic unsaturation of less than 0.020 meq/g, a functionality of 1 or more, and a number average molecular weight $M_n$ such that $$M_n > 3000 \, Da \times F^{0.39}$$

where F is the average nominal functionality of the low intrinsic unsaturation polyol,
said stabilizer precursor having about 0.01 to about 2 mol of induced unsaturation per mol of low intrinsic unsaturation-containing polyoxyalkylene polyether polyol.

2. The stabilizer of claim 1 wherein said low intrinsic unsaturation-containing polyoxyalkylene polyether polyol has an intrinsic unsaturation of less than 0.015 meq/g.

3. The stabilizer of claim 1 wherein said low intrinsic unsaturation-containing polyoxyalkylene polyether polyol has an intrinsic unsaturation of less than 0.010 meq/g.

4. The stabilizer of claim 1 wherein said low intrinsic unsaturation-containing polyoxyalkylene polyether polyol has a molecular weight which satisfies the relationship $M_n > 3500 \, Da \times F^{0.39}$.

5. The stabilizer of claim 2 wherein said low intrinsic unsaturation-containing polyoxyalkylene polyether polyol has a molecular weight which satisfies the relationship $M_n > 3500 \, Da \times F^{0.39}$.

6. The stabilizer of claim 3 wherein said low intrinsic unsaturation-containing polyoxyalkylene polyether polyol has a molecular weight which satisfies the relationship $M_n > 3500 \, Da \times F^{0.39}$.

7. The stabilizer of claim 1 wherein said stabilizer precursor is prepared by reacting said low intrinsic unsaturation-containing polyoxyalkylene polyether polyol with an isocyanate compound containing ethylenic unsaturation.

8. The stabilizer of claim 7 wherein said isocyanate containing ethylenic unsaturation is selected from the group consisting of m-isopropenyl-1,1-dimethylbenzyl isocyanate and isocyanatoalkylacrylates.

9. The stabilizer of claim 1 wherein said stabilizer precursor is prepared by reacting said low intrinsic unsaturation-containing polyoxyalkylene polyether polyol with maleic anhydride and isomerizing at least a portion of the resulting maleate unsaturation to fumarate unsaturation to form a fumarate-isomerized reaction product.

10. The stabilizer of claim 9 wherein the fumarate-isomerized reaction product of said low intrinsic unsaturation-containing polyoxyalkylene polyether polyol is further reacted with alkylene oxide or alkylene glycol to reduce carboxylic half acid functionality.

11. A preformed stabilizer prepared by the in situ polymerization of one or more vinyl monomers in the presence of the stabilizer precursor of claim 1.

12. The preformed stabilizer of claim 11 wherein the vinyl polymer content of said preformed stabilizer is between about 3 weight percent and 20 weight percent, said weight percents based on the total weight of said preformed stabilizer.

13. The preformed stabilizer of claim 11 wherein said vinyl polymer forms a dispersed phase in said preformed stabilizer.

14. A preformed stabilizer prepared by the in situ polymerization of one or more vinyl monomers in the presence of a stabilizer precursor derived from a low intrinsic unsaturation-containing polyoxyalkalene polyether polyol having an intrinsic unsaturation of less than 0.010 meq/g, a functionality of 1 or more, and a number average molecular weight $M_n$ such that $$M_n > 3000 \, Da \times F^{0.39}$$

where F is the average nominal functionality of the low intrinsic unsaturation polyol, said stabilizer precursor having about 0.01 to about 2 mol of induced unsaturation per mol of low intrinsic unsaturation-containing polyoxyalkalene polyether polyol.

15. The preformed stabilizer of claim 14, wherein said low intrinsic unsaturation-containing polyoxyalkylene polyether polyol has a molecular weight which satisfies the relationship $M_n > 3500 \, Da \times F^{0.39}$.

16. The preformed stabilizer of claim 14, wherein said stabilizer precursor is prepared by reacting said low intrinsic unsaturation-containing polyoxyalkylene polyether polyol with an isocyanate compound containing ethylenic unsaturation.

17. The preformed stabilizer of claim 16, wherein said isocyanate containing ethylenic unsaturation is selected from the group consisting of m-isopropenyl-1,1-dimethylbenzyl isocyanate and isocyanatoalkylacrylates.

18. The preformed stabilizer of claim 14, wherein said stabilizer precursor is prepared by reacting said low intrinsic unsaturation-containing polyoxyalkylene polyether polyol with maleic anhydride and isomerizing at least a portion of the resulting maleate unsaturation to fumarate unsaturation to form a fumarate-isomerized reaction product.

19. The preformed stabilizer of claim 18, wherein the fumarate-isomerized reaction product of said low intrinsic unsaturation-containing polyoxyalkylene polyether polyol is further reacted with alkylene oxide or alkylene glycol to reduce carboxylic half acid functionality.

20. A polymer polyol having a viscosity less than 10,000 mPa•s and a vinyl polymer solids content in excess of 30 weight percent, said weight percent based on the total weight of said polymer polyol, prepared by the in situ polymerization of one or more vinyl monomers in a polyol component comprising a stabilizer selected from the group consisting of:
   a) a stabilizer precursor derived from a low intrinsic unsaturation-containing polyoxyalkylene polyether polyol having an intrinsic unsaturation of less than 0.020 meq/g, a functionality of 1 or more, and a number average molecular weight $M_n$ such that $$M_n > 3000 \; Da \times F^{0.39}$$

where F is the average nominal functionality of the low intrinsic unsaturation polyol, said stabilizer precursor having about 0.01 to about 2 mol of induced unsaturation per mol of low intrinsic unsaturation-containing polyoxyalkylene polyether polyol;
   b) a preformed stabilizer prepared by the in situ polymerization of one or more vinyl monomers in the presence of the stabilizer precursor a) to a vinyl polymer content of less than 20 weight percent based on the weight of said preformed stabilizer; and
   c) mixtures thereof.

21. The polymer polyol of claim 20 wherein said vinyl polymer solids content of said polymer polyol is greater than 40 weight percent based on the weight of said polymer polyol, and said viscosity is less than 5000 mPa•s.

22. A polyurethane or polyurethane/urea polymer comprising the reaction product of a polyol component containing one or more of the polymer polyols of claim 20 and one or more di- or polyisocyanates.

23. A process for the preparation of a polymer polyol comprising the in situ polymerization of one or more vinyl monomers in the presence of a base polyol and a stabilizer selected from the group consisting of:
   a) a stabilizer precursor derived from a low intrinsic unsaturation-containing polyoxyalkylene polyether polyol having an intrinsic unsaturation of less than 0.020 meq/g, a functionality of 1 or more, and a number average molecular weight $M_n$ such that $$M_n > 3000 \; Da \times F^{0.39}$$

where F is the average nominal functionality of the low intrinsic unsaturation polyol, said stabilizer precursor having about 0.01 to about 2 mol of induced unsaturation per mol of low intrinsic unsaturation-containing polyoxyalkylene polyether polyol;
   b) a preformed stabilizer prepared by the in situ polymerization of one or more vinyl monomers in the presence of the stabilizer precursor a) to a vinyl polymer content of less than 20 weight percent based on the weight of said preformed stabilizer; and
   c) mixtures thereof;
said polymer polyol having a vinyl polymer solids content as prepared of 30 weight percent or more based on the weight of said polymer polyol, and a viscosity of less than 10,000 mPa•s.

* * * * *